July 11, 1950           C. ZOLA           2,515,069

WIND TUNNEL

Filed March 18, 1946

INVENTOR
COLMAN ZOLA
BY
ATTORNEY

Patented July 11, 1950

2,515,069

UNITED STATES PATENT OFFICE 2,515,069

WIND TUNNEL

Colman Zola, Mount Vernon, N. Y., assignor to the United States of America as represented by the Secretary of the Navy Application March 18, 1946, Serial No. 655,310

2 Claims. (Cl. 73—147)

This invention relates generally to devices for examining the behavior of bodies in a high velocity fluid current, and more particularly to an improved supersonic speed wind tunnel for testing projectiles.

An object of the invention is to provide a supersonic speed wind tunnel which makes use of the gases of combustion from the burning of a combustible composition to produce a high velocity fluid flow.

Another object of the invention is to provide a wind tunnel of the above type which includes means for cooling the combustion gases before they contact the body whose behavior is to be examined.

Another object of the invention resides in the provision of a wind tunnel of this character which is economical to use and extremely simple in arrangement, and which is effective for assisting in the collection of data relating to the behavior of a projectile or other body which is to move with respect to fluid.

A further object of the invention is to provide a diminutive high speed wind tunnel which occupies a minimum of space.

Figure 1:
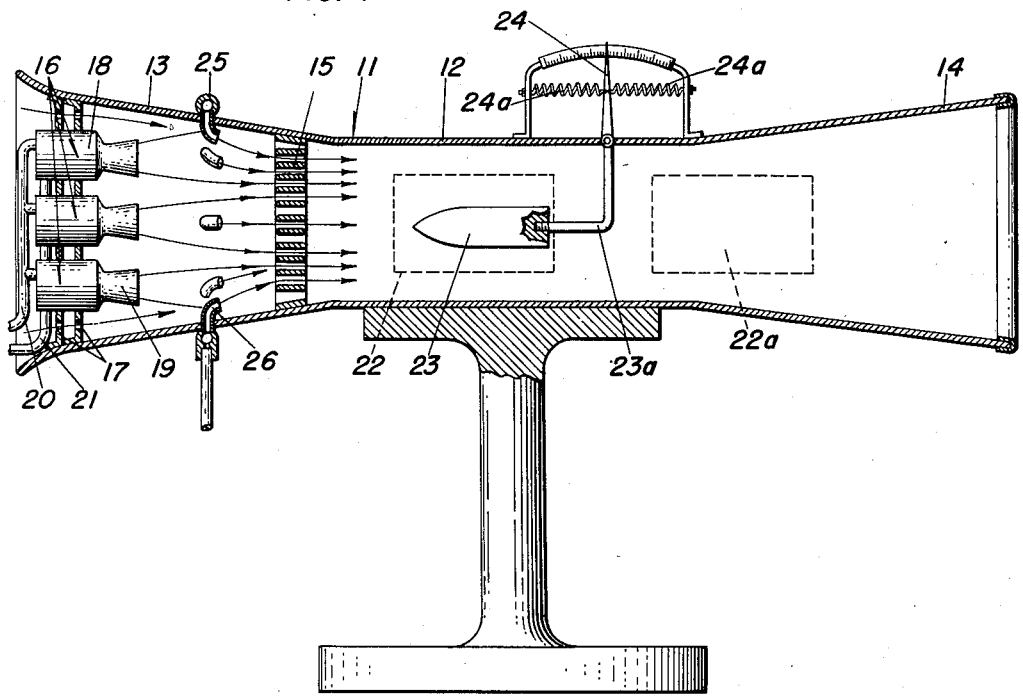
Figure 2:
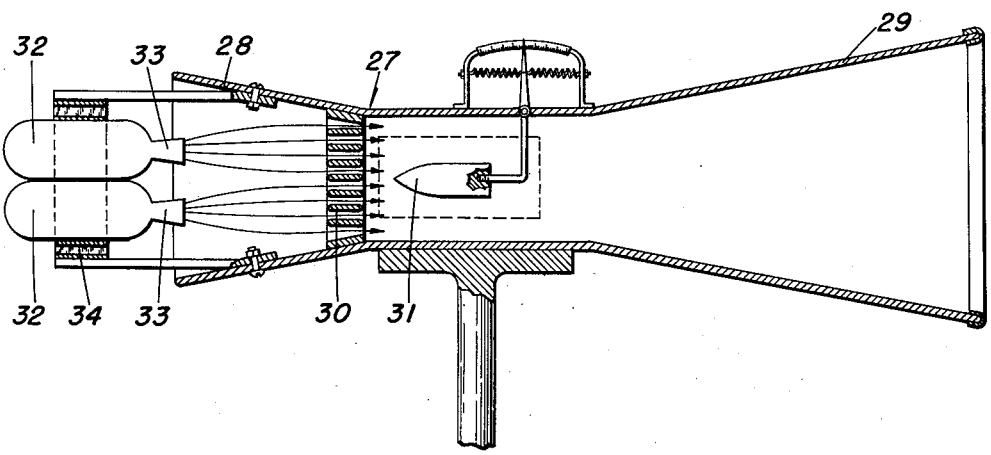

Still further objects of the invention, will become apparent from the following specification and the accompanying drawing, in which Fig. 1 is a longitudinal sectional view, partly in elevation, of a preferred embodiment of my supersonic wind tunnel, a rocket projectile under test being shown therein; and Fig. 2 is a longitudinal sectional view, partly in elevation, showing another embodiment of the invention.

Referring now to Fig. 1 of the drawing, the numeral 11 indicates generally a tubular body or tunnel which is formed of heavy sheet metal or other suitable material. The tunnel 11 which is unidirectional includes an elliptical or cylindrical central portion 12 and flared end portions 13 and 14. The flared portion 13 is of substantially frusto-conical shape and defines an inlet throat; the flared portion 14 defines an outlet throat. An air deturbulizing unit 15 such as a set of spaced vanes is mounted near the inner end of the inlet throat 13.

In order to provide a source of fluid flow at high velocity, I provide a plurality of combustion crucibles 16 which are mounted near the outer end of the inlet throat 13 on suitable brackets 17. In this connection it should be understood that, while I have shown three crucibles, any desired number of them may be employed depending upon the test to be carried out. Each crucible includes a combustion chamber 18 and an inwardly directed discharge nozzle 19. Fuel pipes 20 and 21 from suitable sources of liquid or gaseous fuel (not shown) connect to the chambers 18 of the crucibles 16 where they are ignited and ejected through nozzle 19 to produce a fluid flow of combustion gases having high velocity.

A door, shown in dotted lines at 22, is provided for an opening in the side wall of the central portion 12 of the tunnel 11 to provide access to the interior of said tunnel to permit installation and removal of the bodies to be tested. In this connection I have shown at 23 a rocket projectile or other body under test mounted on a pivoted projectile mounting means comprising an arm 23a which has a part constituting a pointer 24 positioned outside the tunnel, being adapted to traverse a graduated scale for indicating behavior of the projectile. Springs 24a or other suitable means provide support for the projectile mounting arm 23a and constitute biasing means which apply opposing forces on the part 24 to sustain the projectile in a required position. Other suitable indicators or gages (not shown) may be provided if desired.

In operation, a combustible substance in the crucibles 16 is ignited by conventional means and projects streams of fluid at high velocity into the tunnel 11 through the inlet throat 13, and through the deturbulizing unit 15 to flow about the rocket projectile 23 and exit at the outlet throat 14. The flow of high velocity fluid passes evenly about the projectile 23 due to the presence of the deturbulizing unit. In this manner, the behavior of a body such as a projectile is determined under conditions similar to those which it would encounter in actual flight. By the use of the crucibles 16, high velocity fluid flow is obtained without employing large fans or bulky compressor equipment to achieve the desired fluid velocity.

Where the gas flow is generated by combustion, as in the embodiment of Fig. 1, it is sometimes necessary to cool the high velocity fluid before its passing into the tunnel. To accomplish this I provide a circular pipe 25, which is connected to a suitable source of water or other cooling fluid, and has nozzles 26 projecting into the inlet throat of the tunnel for intermingling streams of cooling fluid with the high velocity fluid flowing from the nozzles 19 of the crucibles. Brackets 17 may be apertured in which case the air flow into the throat provides additional cooling for the high velocity fluid flow.

If desired, the tunnel may be provided with an opening and door 22a supplemental to the door 22, so that items under test may be located at any of various positions within the tunnel and thus kept at any desired temperature within a predetermined range during tests. Two stations or positions at which a body is adapted to be tested are thus provided, the one (not shown) adjacent door 22a being identical with the one shown adjacent door 22.

In Fig. 2 I have shown a slightly modified embodiment of the invention. In this view the tunnel is shown generally at 27, and includes an inlet throat 28 and an outlet throat 29. An air deturbulizing unit 30 is mounted in the throat 28 and a body being tested such as a rocket projectile is shown at 31.

In order to produce the desired high velocity fluid flow, reaction motors 32 such as are used for propelling rocket projectiles are employed. These motors which constitute crucibles are preferably of the solid fuel type in which a rocket propellant is burned and discharges products of combustion through nozzles 33. The motors are mounted on brackets 34 secured to the throat 28.

In the operation of this embodiment of the invention, the high velocity fluid flow is initiated simply by igniting the propellants in the rocket motors 32 by electrical or other conventional means (not shown), whereupon the high velocity fluid flow will pass from the nozzles 33 of said motors through the deturbulizing unit 30 and through the tunnel 27 about the rocket projectile 31. If desired a cooling unit similar to the unit shown in Fig. 1 may be employed.

By the use of the invention, bulky and expensive motors and fans previously used in wind tunnels are rendered unnecessary and fluid velocities of greater magnitude are attainable.

It should be understood that, although but two embodiments of the invention are specifically disclosed, other means for achieving the same effect may be resorted to without departing from the spirit of the invention as defined by the appended claims.

I claim:
1. A device for examining the behavior of a body in a high speed fluid current, comprising a tunnel for defining the path of flow of the fluid current, means for mounting said body within said tunnel, a source of high velocity flow of combustion gases, means on said source for directing said flow into said tunnel, and means for injecting a cooling fluid into the tunnel in the direction of said combustion gases to mix therewith prior to the contact of said mixture with said body.

2. A diminutive test apparatus comprising a unidirectional tunnel having an inlet throat and an outlet throat, a plurality of combustion crucibles in which combustible substances are adapted to be burned and thus produce high velocity gas streams, said crucibles each having a nozzle, a bracket secured in the inlet throat on which the crucibles are so emplaced as to direct their nozzles into the tunnel for the propulsion of said streams through the tunnel to exit at the outlet throat, mounting means for a body the aerodynamic behavior of which is to be observed, said means being movably supported in the tunnel and having externally located indicating means signalizing said behavior, and nozzles for directing streams of cooling fluid into and in the direction of the gas stream.

COLMAN ZOLA.

REFERENCES CITED

The following references are of record in the file of this patent:

UNITED STATES PATENTS

| Number | Name | Date |
|---|---|---|
| 2,065,496 | Adams | Dec. 29, 1936 |
| 2,309,938 | Disereus et al. | Feb. 2, 1943 |
| 2,380,516 | Goldberg | July 31, 1945 |

FOREIGN PATENTS

| Number | Country | Date |
|---|---|---|
| 521,143 | Great Britain | May 14, 1940 |
| 792,293 | France | Oct. 14, 1933 |